United States Patent [19]

Barlow

[11] Patent Number: 5,114,264
[45] Date of Patent: May 19, 1992

[54] COUPLING

[75] Inventor: Philip D. Barlow, Warwickshire, England

[73] Assignee: Hahn & Kolb GmbH & Co., Fed. Rep. of Germany

[21] Appl. No.: 616,430

[22] Filed: Nov. 21, 1990

[30] Foreign Application Priority Data

Nov. 25, 1989 [GB] United Kingdom ............... 8926672
Feb. 17, 1990 [GB] United Kingdom ............... 9003651

[51] Int. Cl.⁵ .................................................. B25G 3/18
[52] U.S. Cl. ..................................... 403/323; 403/361; 403/379
[58] Field of Search ............... 403/355, 356, 360, 361, 403/379, 323

[56] References Cited

U.S. PATENT DOCUMENTS

| | | | |
|---|---|---|---|
| 2,215,424 | 9/1940 | Klein | 403/360 X |
| 3,125,144 | 3/1964 | Lundell | 403/323 X |
| 3,285,668 | 11/1966 | Fearon | 403/355 X |
| 3,625,551 | 12/1971 | Branton | 403/355 X |
| 3,638,352 | 1/1972 | Christiansen | 403/355 X |
| 3,814,462 | 6/1974 | Kelly | 403/323 X |
| 3,871,777 | 3/1975 | Sauer | 403/323 X |
| 4,171,822 | 10/1979 | Thun | 403/379 X |
| 4,534,640 | 10/1970 | Macy | 403/355 X |
| 4,579,477 | 4/1986 | Hartman | 403/379 X |
| 4,602,445 | 7/1986 | Nilsson | 403/379 X |
| 4,701,074 | 10/1987 | Hall | 403/323 X |
| 4,768,750 | 9/1988 | Wilson | 403/379 X |

Primary Examiner—Andrew V. Kundrat
Attorney, Agent, or Firm—Andrus, Sceales, Starke & Sawall

[57] ABSTRACT

A coupling for securing together a pair of members includes a spigot on one member which can be located in a bore in the other member. An angularly adjustable member is located in a transverse bore in the member and defines a thrust surface engageable with a thrust surface on the spigot to draw radially extending thrust faces on the two members into firm axial engagement. The spigot and the bore also define spaced annular cylindrical locating surfaces which provide radial location of the pair of members.

10 Claims, 2 Drawing Sheets

COUPLING

This invention relates to a coupling for securing together two parts for example, a tool and a tool holder of a machine tool, the coupling being of the kind comprising a first member defining a cylindrical spigot and a first radially extending thrust face and a second member defining a second radially extending thrust face and also a spigot bore in which the spigot locates, and means operable to move the members relative to each other so that said thrust faces are urged into engagement with each other.

In a known form of coupling of the aforesaid kind the means comprises a slidable plunger which is located in a transverse drilling in the spigot. At one end the plunger is of frusto conical form and at the other end it is formed with a recess in which is engagable the frusto conical end of a clamping screw which is mounted in the second member. The second member also carries a reaction screw in the inner end of which is formed a recess in which in use, locates the one end of the plunger. The axes of the two screws are offset so that as the clamping screw is tightened, the thrust faces on the two members are urged into engagement.

The aforesaid coupling is very effective in use but it has the disadvantage that in order to separate the two members it is necessary to undo at least the clamping screw by an amount sufficient to withdraw the frusto conical end of the screw from the bore in which the spigot is located. Moreover, once this has been done the plunger has to move axially within the drilling so that its frusto conical end lies within the drilling. Such axial movement of the plunger will normally occur as the two members are separated but it is found that the plunger can stick within the bore in which case it is necessary to remove the reaction screw to allow access to the plunger so that it can be driven axially.

The object of the present invention is to provide a coupling of the kind specified in a simple and convenient form.

According to the invention in a coupling of the kind specified said means comprises a further bore formed in the second member, the further bore extending parallel to a tangent to the spigot bore, an angularly adjustable member mounted in the further bore and movable about the axis of the further bore a first thrust surface defined on the spigot, a second thrust surface defined on said angularly adjustable member for engagement with the first thrust surface when the spigot is located within the spigot bore, said thrust surface when the angularly adjustable member is moved about the axis of the further bore, cooperating to produce an axial thrust which urges said thrust faces into engagement with each other.

An example of a coupling in accordance with the invention will now be described with reference to the accompanying drawings in which.

Figure 1:
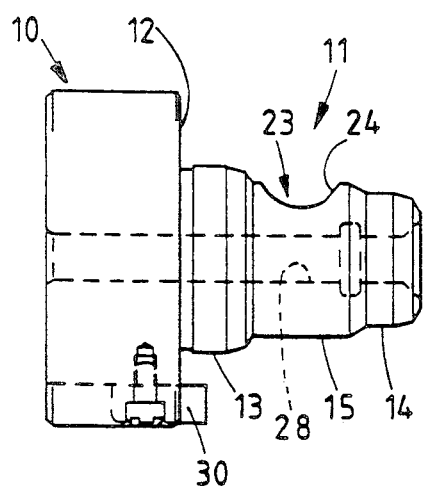
FIG. 1 is a side elevation of the first member of the coupling.
Figure 2:
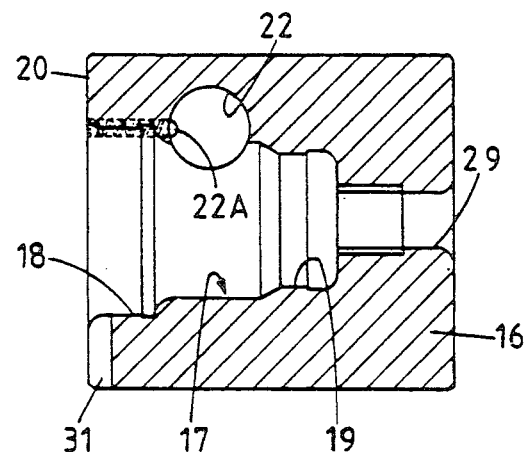
FIG. 2 is a sectional side elevation of the second member of the coupling.
Figure 3:
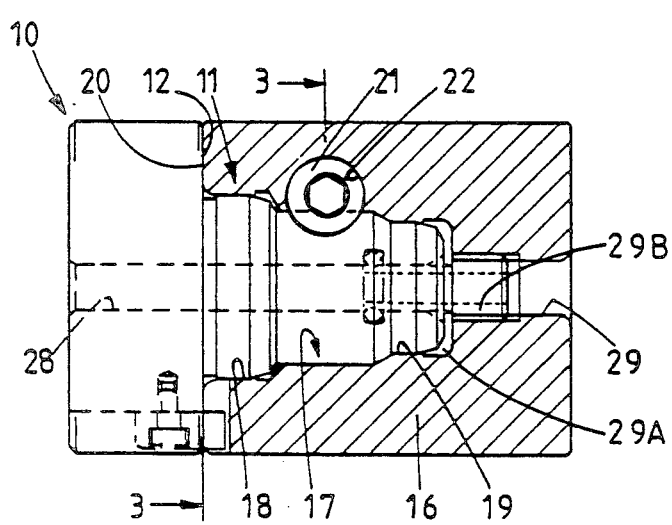
FIG. 3 is a view showing the two members in coupled relationship.
Figure 4:
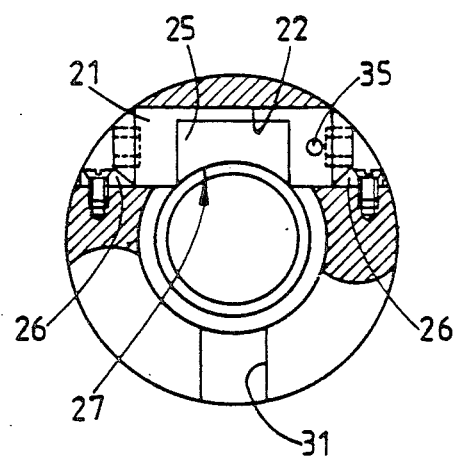
Figure 5:
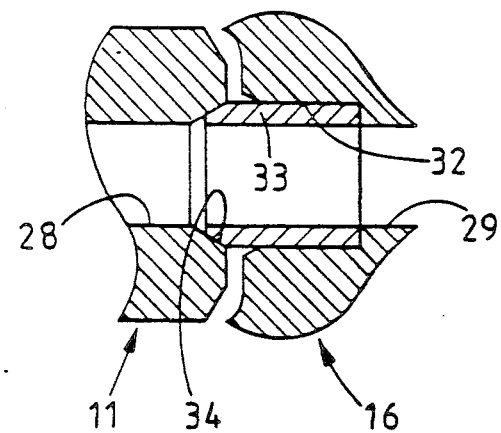
Figure 8:
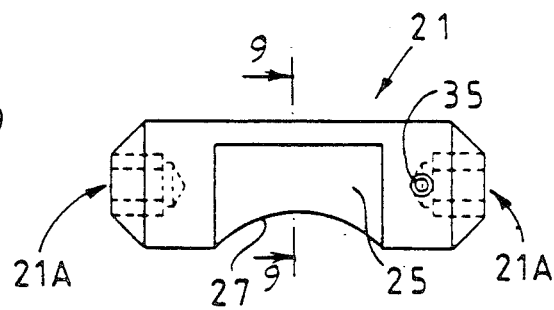
Figure 6:
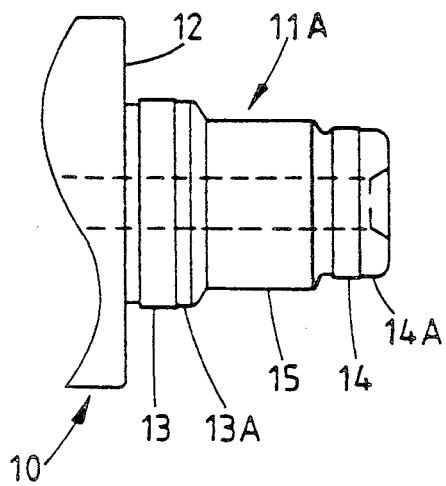
Figure 10:
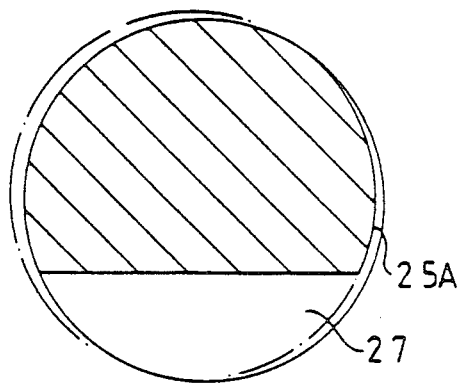
Figure 7:
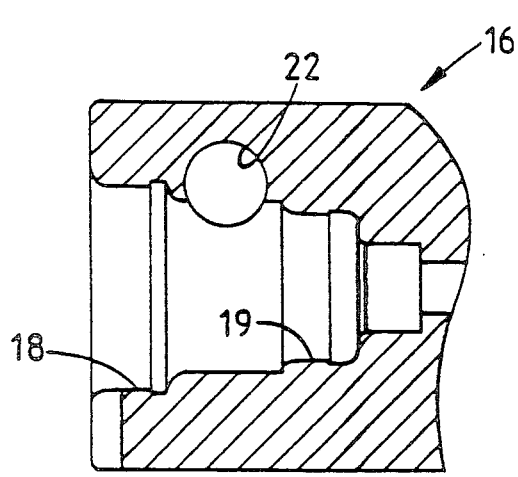
Figure 9:
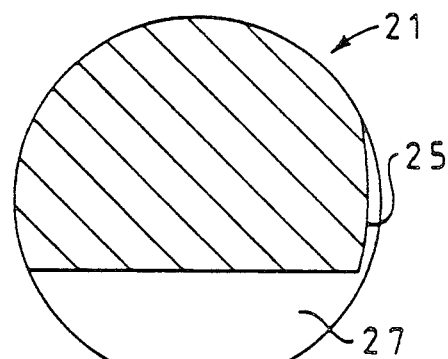

FIG. 4 is a part section on the line 3—3 of FIG. 3 with the first coupling member removed, FIG. 5 shows to an enlarged scale an example of a coolant connection between the members, FIGS. 6 and 7 are views corresponding to FIGS. 1 and 2 showing a modification, FIG. 8 is a view showing part of the coupling seen in FIGS. 3 and 4 in isolation, FIG. 9 is a section on line 9—9 of FIG. 8, and FIG. 10 is a view similar to FIG. 9 showing a modification.

The coupling which is illustrated in the drawings is intended to be used for mounting a boring bar or the like in a tool holder of a machine tool and in this case the first member as shown in FIG. 1, will be integrally formed with the tool whilst a second member shown in FIG. 2, will form part of the holder of the machine tool. Referring to the drawings the first member comprises a cylindrical body 10 from which extends an integral spigot 11. The spigot is of stepped form generally diminishing in diameter as the distance from the body 10 increases. The body 10 defines a radially extending thrust face 12 and the spigot is machined to define a pair of spaced cylindrical locating surfaces 13, 14, the surface 14 being of a smaller diameter than the surface 13. Beyond the surface 14 the spigot is tapered to its end and intermediate the surfaces there is formed a plain cylindrical portion 15.

The second member comprises a body 16 in which is formed a bore 17 which has a shape generally complementary to the shape of the spigot. The bore is accurately ground to define locating surfaces 18 and 19 for engagement by the locating surfaces 13, 14 respectively on the spigot. The remaining portions of the bore are machined to provide a clearance with the corresponding portions of the spigot. In addition, the body 16 defines a radially extending thrust face 20 at the open end of the bore.

FIG. 3 shows the first and second members engaged with each other with the locating surfaces 13, 14 and 18, 19 providing radial location of the two members and with the radially extending thrust faces 12, 20 in engagement with each other.

The members are held in assembled relationship so that the thrust faces 12, 20 are in positive engagement by means of an angularly adjustable member indicated at 21 and which is located in a further bore 22 machined in the body 16 of the second member. The axis of the bore 22 extends parallel to a tangent of the bore 17 and as will be seen from FIGS. 2, 3 and 4 the bore 22 breaks into the bore 17. As will be seen from FIG. 1 the plain cylindrical portion 15 of the spigot is provided with a cut-out 23 which is of part cylindrical form. A portion of the cut-out defines a first thrust surface 24, the thrust surface lying on that portion of the cut-out 23 which is remote from the body 10. The angularly adjustable member 21 as shown in FIGS. 8 and 9, also defines a thrust surface 25, and the arrangement is such that when the member 21 is moved angularly about its axis, the thrust surfaces 24 and 25 co-operate with each other and an axial force is produced which draws the thrust faces 12 and 20 into firm engagement with each other. Conveniently the thrust surfaces 24 and 25 are shaped so that the thrust which is applied to the spigot takes place at an angle generally 40° from a radius through the spigot and as a result a radial force will also be applied to the spigot tending to urge the portions of the locating surfaces on the spigot and in the bore and which lie on the side remote from the angularly adjustable member, into firm engagement with each other. Thus the two members are held in secure and accurate engagement. In the example shown in FIGS. 8 and 9, the thrust surface 25 has a special contour which is expensive to machine. It has been realised that the equivalent of the special contour can be obtained as shown in FIG. 10, by machining the thrust surface 25A to a cylindrical form the axis of which is slightly offset to the axis of rotation of the member 21.

As will be seen from FIGS. 4 and 8 the ends of the angularly adjustable member 21 are chamfered and hexagonal recesses 21A are formed therein to receive a hexagonal key whereby the member can be moved angularly. In addition, in order to locate and retain the angularly movable member 21 within the bore 22, the chamfered ends of the member engage with retaining shoes 26 respectively which are secured in the open end of the bore 22. It will be noted that the angularly adjustable members 21 is provided with a part cylindrical cut-out 27 intermediate its ends so that when it is moved to an inoperative position, the spigot can be drawn out of the bore 17. In order that the operator can recognize the correct angular position of the member 21 to engage and disengage the spigot 11 from the bore 17, 16 a detent 35 (FIG. 4) is formed in the surface of the member 21 into which locates a spring loaded ball 22A when the member is in the correct position for disengagement. The ball 22A and the associated spring, together with a grub screw are located in a drilling extending inwardly from the thrust face 20.

In the particular application, it is desired that the two members should provide for the passage of coolant to the tool and as will be observed from the drawings the spigot 11 and the associated body 10 have a central passage 29. These two passages are in communication with each other however, it is desirable to prevent the coolant from passing into the space 29a between the blind end of the bore 17 and the spigot and hence a tubular member 29B is secured within the end of the bore 29 and it extends into the bore 28, the latter having a recess which is illustrated, to accommodate a seal member. The coolant is therefore prevented from passing into the aforesaid space 29A and this helps to prevent jamming of the spigot within the bore which has been found to occur due to an accumulation of sediment suspended in the coolant.

Alternatively and as shown in FIG. 5, the passage 29 is relieved at its outer end to form a recess 32 in which is located an annular elastomeric sealing member 33. In its relaxed state the outer face of the projecting portion of the sealing member is tapered so that in the fully engaged state of the two members as shown in FIG. 5, it can conform more readily to the truncated conical recess 34 which is formed in the end of the spigot 11.

The coupling as described since the thrust surfaces 24 and 25 are flat straight in the transverse direction so as to make line contact with each other when engaged, tends to tighten as torque is applied between the two bodies 10, 16. However, since excessive torque may damage the thrust surfaces, it is proposed to provide a drive key carried by one of the members and which is engaged within a slot in the other. The key is illustrated at 30 in FIG. 1 and it locates within a slot 31 formed in the body 16.

As described only one angularly adjustable member 21 is provided however, if additional security is required a further angularly adjustable member may be provided which would be located on the opposite side of the spigot. As described above, the diameters of the locating surfaces 13 and 18 are larger than the diameters of the locating surfaces 14 and 19. This facilitates separation of the two members in much the same manner as the conventional taper form of coupling. However, unlike a taper connection they do not have a self centring action and as a result it is possible particularly when engaging the spigot 11 within the bore 17 to jam the two members if their axes are not in alignment.

In order to minimise the risk of jamming the two members 10, 16 during engagement, the profile of the spigot 11 is modified as shown in FIG. 6. In the arrangement shown in FIG. 1, the portions of the spigot 11 to the sides of the locating surfaces 13, 14 remote from the body 10, taper inwardly to the intermediate plain cylindrical portion 15 and the end of the spigot respectively. As modified and shown in FIG. 6 the respective portions of the spigot 11A define cylindrical guide surfaces 13A, 14A which are of slightly smaller diameter than the respective locating surfaces 13, 14.

In the process of engaging the modified spigot 11A within the bore 17 the guide surfaces 13A, 14A engage with the locating surfaces 18, 19 of the bore at substantially the same time. The possible degree of misalignment is limited and the actual degree of misalignment is reduced as the locating surfaces 13 and 14 approach the locating surfaces 18 and 19. At the point of engagement of the respective locating surfaces the possible degree of misalignment is reduced to the extent that jamming of the spigot 11a in the bore is unlikely to occur. FIG. 7 shows a slight modification to the member 16 which further reduces the possibility of jamming. In FIG. 7 the locating surface 19 is of slightly increased axial length and the step between the surface 19 and the intermediate portion of the bore 17 is radiused.

The connector can be made in various sizes with appropriate scaling of the various parts. As the size is reduced the only change in design relates to the retaining shoes 22 and the screws which secure the shoes. It is proposed to modify the shape of the retaining shoes and to incline the axes of the screws outwardly.

I claim:

1. A coupling for securing together two parts comprising a first member defining a cylindrical spigot having a fist pair of spaced cylindrical locating surfaces and a first radially extending thrust face, and a second member defining a second radially extending thrust face and also a spigot bore in which the spigot locates, the spigot bore having a second pair of locating surfaces complementary to the first pair of locating surfaces, said first and second pairs of locating surfaces engaging with each other when the spigot is located in the spigot bore to provide radial location of the first and second members and means operable to move the members relative to each other so that the thrust faces are urged into engagement with each other, said means comprising a further bore formed in the second member, said further bore extending parallel to a tangent to the spigot bore, an angularly adjustable member mounted in the further bore and movable about the axis of the further bore, a first thrust surface defined on the spigot, a second thrust surface defined on the angularly adjustable member for engagement with the first thrust surface when the spigot is located in the spigot bore, said thrust surfaces, when the angularly adjustable member is moved about the axis of the further bore, cooperating to produce an axial thrust which urges said thrust faces into engagement with each other.

2. A coupling according to claim 1, including a drive key mounted on one of the first and second members and a slot in the other of the first and second members, the key and the slot being engagable to transmit torque between the first and second members.

3. A coupling according to claim 1, wherein said first member includes an enlarged body defining said first thrust face, and in which the one locating surface of the fist pair which is furthest from the body is smaller in diameter than the other locating surface of said pair.

4. A coupling according to claim 3, in which a portion of the spigot intermediate said first pair of locating surfaces defines a plain cylindrical surface having a diameter which lies between the diameters of said first pair of locating surfaces.

5. A coupling according to claim 4, in which said plain cylindrical surface is formed with a cut-out part of which defines said first thrust surface.

6. A coupling according to claim 5, in which said spigot is provided with cylindrical guide surfaces which are located adjacent the locating surfaces respectively on the sides thereof remote from the body, said guide surfaces having a diameter slightly smaller than the respective adjacent locating surfaces.

7. A coupling according to claim 6, in which a step defined between the smaller of the locating surfaces in the spigot bore and a portion of the spigot bore lying between said pair of locating surfaces, is radiused.

8. A coupling according to claim 1, including an annular elastomeric sealing member which is housed in a recess in one of the members, said sealing member engaging the other member when the spigot is located in the spigot bore said sealing member acting to convey liquid between passages formed in the members respectively.

9. A coupling according to claim 1, in which said angularly adjustable member is provided with a part cylindrical cut-out intermediate its ends, which in an inoperative position of the angularly adjustable member allows the spigot to be inserted into and withdrawn from the spigot bore, and detent means operable to retain the angularly movable member in the inoperative position.

10. A coupling for securing together two parts comprising a first member defining a cylindrical spigot and a first radially extending thrust face, the spigot having a first pair of spaced cylindrical locating surfaces and a second member defining a second radially extending thrust face and also a spigot bore in which the spigot locates, spigot bore having a second pair of locating surfaces complementary to the first pair of locating surfaces, said first and second pairs of locating surfaces engaging with each other when the spigot is located in the spigot bore to provide radial location of the first and second members, and means operable to move the members relative to each other so that the thrust faces are urged into engagement with each other.

* * * * *